2,789,991
SUBSTITUTED DISULFONES

John A. Brockman, Jr., and Paul F. Fabio, Pearl River, N. Y., assignors to American Cyanamid Company, New York, N. Y., a corporation of Maine No Drawing. Application May 20, 1954,
Serial No. 431,261

5 Claims. (Cl. 260—400)

This invention relates to new organic compounds. More particularly, it relates to aliphatic disulfones and a method of preparing the same.

The preparation of diaromatic sulfones which as substituted diphenyl sulfones is well known. These compounds have been used as tuberculostatic agents and for other purposes. The prior art, however, has not described alkyl and alkenyl substituted fatty acid disulfones.

The compounds of the present invention can be represented by the following structural formula:

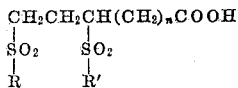

in which R and R' are alkyl or alkenyl radicals and $n$ is a small whole number not less than 2 nor more than 6. Since the present compounds contain carboxylic acid groups, they will form salts such as alkali metal, alkaline earth metal salts, etc. which are intended to be included within the scope of the present invention.

The compounds of the present invention are somewhat soluble in water and in the form of their salts, are more soluble in water. In some instances they are solids, in others oils. Those which are oils have a tendency to decompose on distillation.

The present compounds are prepared by oxidizing the corresponding dialkyl or alkenyl dithio fatty acids. These intermediates can be compounds such as 4,6-bis-methylthiohexanoic acid; 4,6-bis-ethylthiohexanoic acid; 5,7-bis-methylthioheptanoic acid; 5,7-bis-ethylheptanoic acid; 6,8-bis-methylthiooctanoic acid; 6,8-bis-ethylthiooctanoic acid; 6,8-bis-allylthiooctanoic acid; 7,9-bis-methylthiononanoic acid; 7,9-bis-ethylthiononanoic acid; 7,9-bis-allylthiononanoic acid; 8,10-bis-methylthiodecanoic acid; 8,10-bis-ethylthiodecanoic acid, and the like.

The above intermediates in turn can be prepared by forming the sodium salt of the corresponding dimercaptan and reacting the sodium salt with an alkyl or alkenyl halide as shown hereinafter in the examples.

In carrying out the present process the bis-alkyl or alkenylthio acid is preferably dissolved in a solvent such as, for example, glacial acetic acid, formic acid, tertiary butyl alcohol or water under neutral or alkaline conditions.

The dithio acid is then oxidized to the corresponding disulphonyl compound. We have found that the oxidation will take place readily when hydrogen peroxide (Superoxol) is used as the oxidizing agent. Other oxidizing agents can be used such as peroxides, peracids, permanganates such as sodium, potassium or barium, dichromates such as sodium or potassium (in the presence of mineral acid), and the like. The reaction is generally exothermic and the reaction mixture is preferably kept between 0° C. and 75° C., depending upon the oxidizing agent, for the initial reaction. The reaction is completed, when using peroxides or peracids, by heating the reaction mixture at refluxing temperatures for a short period of time. The solvent is removed and the product purified by recrystallization if a solid. However, if the product is an oil, it can be distilled provided it does not decompose. If the product decomposes below its boiling point, then a salt of the product such as the p-bromobenzylthiuronium can be prepared and purified followed by conversion of the salt back to the original product.

The compounds of the present invention are biologically active in stimulating the growth of microorganisms requiring protogen. For example, they stimulate the growth of species of corynebacterium in a synthetic medium containing no protogen. They are therefore useful in the study of the growth requirements of bacteria. Since these compounds are structurally related to thioctic acid they are useful in the study of the metabolism of vital keto acids such as alpha-keto-glutamic acid and pyruvic acid.

The following examples describe in greater detail the preparation of representative fatty acid disulfones of the present invention.

EXAMPLE 1

6,8-bis-methylsulfonyloctanoic acid

In a 250 ml. flask equipped with magnetic stirrer and Dry-Ice reflux condenser were placed 2.06 g. (0.010 mole) 6-thioctic acid and about 120 ml. dry liquid ammonia. The thioctic acid did not dissolve. Pieces of sodium metal were added until a blue color persisted for 15 minutes, 0.75 g. (0.034 g. atm.) being required. Two drops of alcohol were added to decolorize the mixture. Most of the material was now in solution. Next was added 1.5 ml. (0.024 mole) methyl iodide, and the mixture was stirred and allowed to reflux until a negative nitroprusside test for mercaptan was obtained. This took about 15 minutes. The ammonia was allowed to evaporate spontaneously, the last traces were removed under reduced pressure, 20 ml. of water, 5 ml. of 6 N hydrochloric acid were added and the mixture extracted twice with 10 ml. portions of chloroform. The chloroform was dried with sodium sulfate and distilled to leave an oily residue which was distilled at 0.04 mm. and gave the following fractions:

| Fraction | Temp. (°C.) | Wt. (g.) | $n_D^{20}$ |
|---|---|---|---|
| 1 | 153–159 | .265 | 1.5154 |
| 2 | 159–163 | .557 | 1.5163 |
| 3 | 163–161 | .675 | 1.5165 |
| 4 | 161–158 | .481 | 1.5168 |

The yield was 1.98 g. (84%). Analysis of fraction 3 agreed closely with the theoretical values for carbon, hydrogen and sulfur.

In 8 ml. of glacial acetic acid 1.18 g. (0.0050 mole) of the above 6,8-bis-methylthiooctanoic acid was treated dropwise with 2.2 ml. (0.053 eq. H2O2 by titration) of hydrogen peroxide (Superoxol). Considerable heat was liberated and cooling was applied to keep the temperature at about 65°–70° C. The mixture was next refluxed two hours and allowed to stand overnight at room temperature. The acetic acid was removed at the water pump and the residual oil induced to crystallize by cooling with Dry Ice. The crystalline residue was recrystallized from alcohol to give 1.35 g. (90%) of clusters of needles, melting point 109°–113° C. An analytical sample was crystallized three more times from alcohol, melting point 115.5°–116.5° C. The compound could also be crystallized from water.

EXAMPLE 2

6,8-bis-ethylsulfonyloctanoic acid

A 4.13 g. sample (0.020 mole) of 6-thioctic acid was reduced with 1.56 g. (.068 g. atm.) of sodium in 240 ml. of refluxing liquid ammonia. The blue color was removed with 16 drops of 3A alcohol and 3.9 ml. (.048 mole) of ethyl iodide was added. After one hour of refluxing the nitroprusside test for mercaptan was negative. The ammonia was allowed to evaporate spontaneously, the last traces were removed under reduced pressure, 40 ml. of water and 45 ml. of 6 N hydrochloric acid were added and the mixture extracted with two 20 ml. portions of chloroform. The combined chloroform extracts were dried with sodium sulfate and distilled to give the following fractions at 0.07 to 0.08 mm. after removal of the chloroform:

| Fraction | Boiling Point, degrees | Wt. (g.) | $n_D^{20}$ | $d_{20}$ |
|---|---|---|---|---|
| 1 | 152 | .839 | 1.5080 | |
| 2 | 152 | .612 | 1.5086 | |
| 3 | 152 | .756 | 1.5092 | |
| 4 | 152 | .830 | 1.5092 | 1.046 |
| 5 | 152 | .730 | 1.5092 | |
| 6 | 152 | .511 | 1.5092 | |
| | | 4.28 (81%) | | |

The analysis of fraction 4 agree closely with the theoretical values for carbon, hydrogen and sulfur.

A 4.30 g. (.0165 mole) sample of the above 6,8-bis-ethylthiooctanoic acid was oxidized with 7.65 ml. (.175 eq. of $H_2O_2$) hydrogen peroxide (Superoxol) in 20 ml. glacial acetic acid as described above in Example 1 refluxing for two hours. Evaporation of the solvent left an oil which could not be induced to crystallize. A p-bromobenzylthiuronium salt was prepared by treating a neutralized aqueous solution of the oil with an alcoholic solution of p-bromobenzylthiuronium bromide and recrystallizing the resulting precipitate from ethanol. This salt melted at 100°–101° C.

A sample of this salt was converted back to the free acid by treating with sulfuric acid (the bromobenzylthiuronium sulfate is very insoluble in water and the disulfone is quite soluble). Again there was obtained an oil which could not be crystallized and which could not be distilled without decomposition.

EXAMPLE 3

6,8-bis-allylsulfonyloctanoic acid

A 4.13 g. (0.020 mole) sample of 6-thioctic acid was treated as in Example 1 above with 1.53 g. of sodium, 240 ml. ammonia, 17 drops alcohol and 4.1 ml. (0.048 mole) of allyl bromide. Nitroprusside test was negative after one minute of refluxing. The 6,8-bis-allylthiooctanoic acid was worked up in the same manner as in Example 2. The product distilled at 166°–167° C. at 0.09–0.13 mm. The 6,8-bis-allylthiooctanoic acid can then be oxidized to produce 6,8-bis-allylsulfonyloctanoic acid.

We claim:

1. A compound of the group consisting of those having the formula

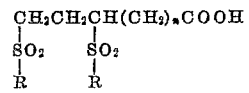

in which R is a member of the group consisting of lower alkyl and lower alkenyl radicals and $n$ is a whole number not less than 2 nor greater than 6 and salts thereof.

2. Compounds in accordance with claim 1 in which R is a lower alkyl radical.
3. The compound 6,8-bis-methylsulfonyloctanoic acid.
4. The compound 6,8-bis-ethylsulfonyloctanoic acid.
5. The compound 6,8-bis-allylsulfonyloctanoic acid.

References Cited in the file of this patent

UNITED STATES PATENTS

| | | |
|---|---|---|
| 2,422,246 | Lazier et al. | June 17, 1947 |
| 2,451,874 | Routson | Oct. 19, 1948 |
| 2,677,617 | Thompson | May 4, 1954 |
| 2,695,898 | Lober et al. | Nov. 30, 1954 |

OTHER REFERENCES

Pomerantz and Conner: J. A. C. S., vol. 61, 1939, page 3386.

Stuffer: Deutsche Chemische Gesellschaft Berichte; vol. 23, 1408 (1890) page 3226 ff.

Bullock et al.: J. A. C. S.; vol. 74, No. 13, page 3455.

Richter: "Organic Chemistry," © 1938, 1943 and 1952, p. 271.

M. W. Cronyn, "J. Am. Chem. Soc." vol. 74 (1952), pp. 1225–30.